United States Patent [19]

Rood

[11] 4,349,947
[45] Sep. 21, 1982

[54] METHOD FOR MANUFACTURING AN AIRLESS SPRAY NOZZLE

[75] Inventor: Alvin A. Rood, Oberlin, Ohio

[73] Assignee: Nordson Corporation, Amherst, Ohio

[21] Appl. No.: 191,935

[22] Filed: Sep. 29, 1980

[51] Int. Cl.³ .................. B23P 15/00; B23P 13/00; B05B 1/06

[52] U.S. Cl. ............................ 29/157 C; 29/558; 228/136; 239/599

[58] Field of Search .......... 29/157 C, 558; 228/135, 228/136; 239/600, 597, 599

[56] References Cited

U.S. PATENT DOCUMENTS

| | | | |
|---|---|---|---|
| 2,522,928 | 9/1950 | Carroll | 239/597 |
| 2,774,631 | 12/1956 | Wahlin | 29/157 C |
| 3,000,576 | 9/1961 | Levey et al. | 239/597 |
| 3,406,912 | 10/1968 | Claffey | 239/600 |
| 3,546,883 | 12/1970 | Mundig | 29/157 C |
| 3,556,411 | 1/1971 | Nord et al. | 239/599 |
| 3,841,567 | 10/1974 | Drozek et al. | 239/570 |
| 3,913,421 | 10/1975 | Hawkins | 228/136 |
| 4,232,824 | 11/1980 | Binoche | 239/599 |

FOREIGN PATENT DOCUMENTS

| | | | |
|---|---|---|---|
| 436881 | 10/1935 | United Kingdom | 228/136 |
| 685976 | 1/1953 | United Kingdom | 239/597 |

Primary Examiner—Daniel C. Crane
Attorney, Agent, or Firm—Wood, Herron & Evans

[57] ABSTRACT

An airless spray nozzle comprising a nozzle adapter and a hard, abrasive resistant nozzle tip. The nozzle tip is sealingly brazed within an axial passage of the adapter and is mechanically locked against hydraulic pressure ejection from the adapter by lips formed on the adapter and swaged over the tip. The nozzle adapter is manufactured by a series of machining steps which includes trepanning a recess into the front face of the adapter and then subsequently straddle milling the front face to simultaneously form protective ears on the front face of the nozzle and the lips for mechanically locking the tip into the adapter. After assembly of the nozzle and tip, an outlet orifice is machined into the tip by passing a cutter grinder wheel between the spaced ears and the spaced lips on the front face of the adapter.

5 Claims, 7 Drawing Figures

HEAT TO FUSE ASSEMBLY

TURN, DRILL & COUNTERBORE

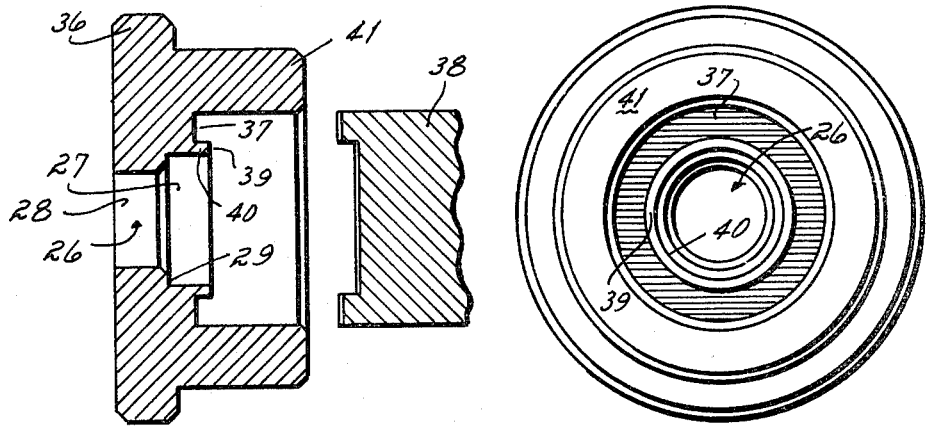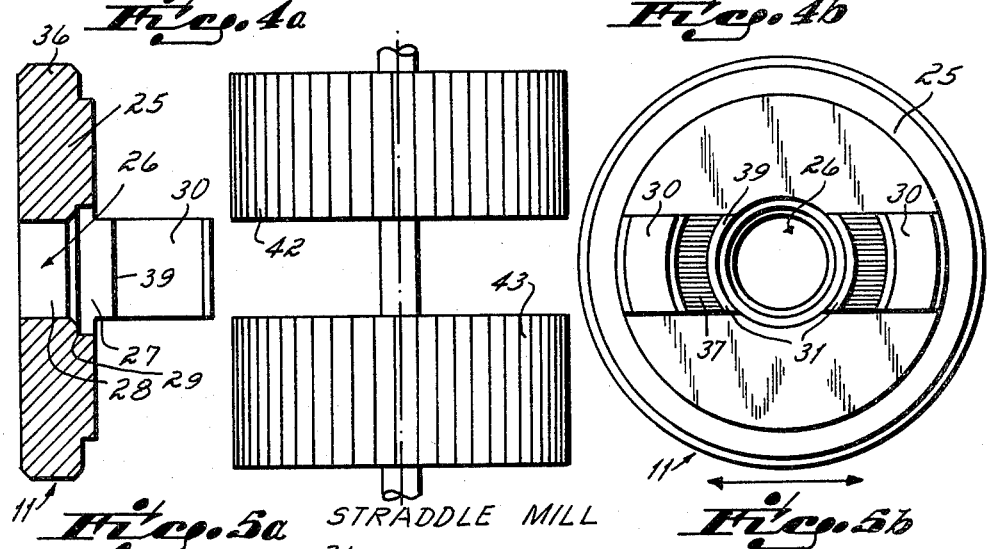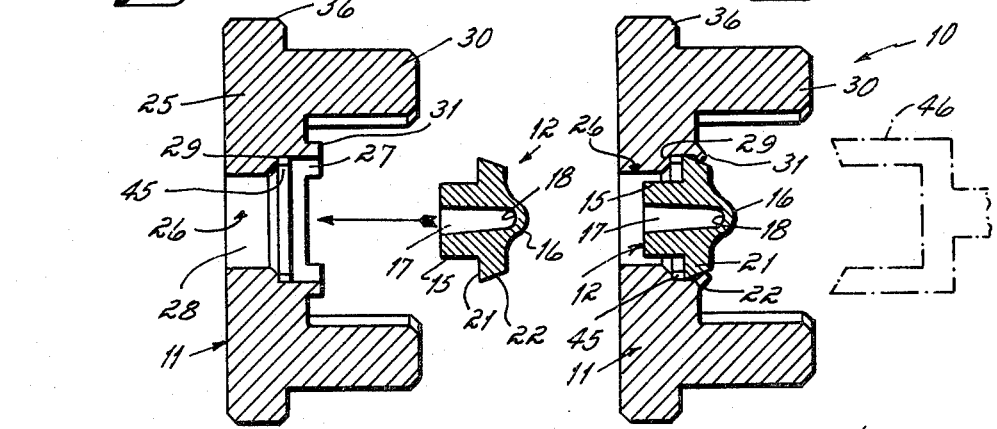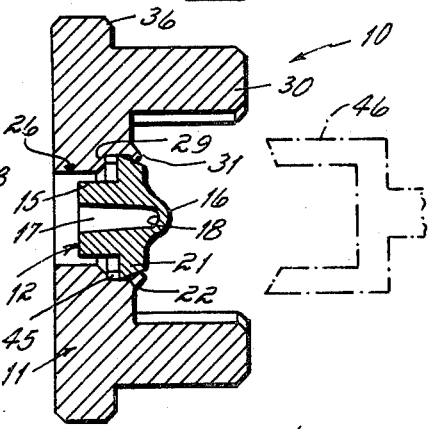

METHOD FOR MANUFACTURING AN AIRLESS SPRAY NOZZLE

This invention relates to apparatus for spraying paints, lacquers, and similar coating materials and to a method of manufacturing such apparatus. More particularly, this invention relates to a spray nozzle and method of manufacturing the spray nozzle.

In the past, there have evolved two distinct types of paint spraying equipment. The first type can be characterized as "airless" spraying equipment. In an airless type of spraying apparatus, a paint stream is forced through an orifice under a relatively high pressure, as for example, a pressure on the order of 300 to 1,000 psi. As the paint is propelled through the small orifice, it is broken up or atomized into very fine droplets. The paint spray dispensed from the orifice then moves at a relatively low velocity toward the article to be painted. In many cases, the paint spraying operation is carried out in the presence of a high voltage electrostatic field in which the work to be coated is kept at, or close to, ground potential while the atomized paint particles are charged to a relatively high electrostatic potential. These particles are then additionally urged toward the work by the forces of the electrostatic field.

This airless type of spraying has the recognized advantage of providing a very high deposition efficiency, i.e., a large portion of the paint spray emitted from the gun is effectively deposited on the article to be coated.

The second general type of spray equipment does not require a high pressure paint source. This second type of spray system, known as air spray, relies upon a stream of air to break up the paint into particle size suitable for spraying. In conventional air spray equipment, the paint is extruded from a nozzle in a generally rod-like form and is subjected to a high pressure blast of air. In a typical air spray installation, the liquid is extruded from the nozzle at a pressure of approximately 50 psi and the air pressure at the gun is at a pressure of approximately 75 psi. This air pressure or air stream impacting upon the rod-like extrusion of paint, has the effect of blasting or breaking up the stream into small droplets or paint particles.

A characteristic of many paints is that they contain a substantial portion of abrasive materials. In the course of passage through the nozzle orifice, whether at a low pressure, as in the air spray systems, or at a relatively high pressure, as in the airless spray systems, paints tend to wear or abrade away the nozzle orifice. Consequently, the nozzle orifice is usually formed in a nozzle tip made from a material having a high resistance to abrasion. Such a tip is commonly manufactured from a very hard material, as for example, tungsten carbide. Even when manufactured from a very hard material the nozzle tips are subject to wear and must be regularly replaced. As a replaceable item, the nozzles are therefore manufactured as inexpensively as possible.

One common expedient for minimizing the cost of the nozzle is to manufacture the nozzle in two pieces, one a very small nozzle tip of very hard, abrasive resistant, material and the other a more easily machined, less expensive but less abrasive resistant nozzle mount. This nozzle mount is commonly referred to as an adapter within which the nozzle tip is mounted.

In the past it has been common practice to mount the nozzle tip within the adapter by brazing the tip to the adapter. The adapter was then secured to a nozzle assembly by a conventional threaded connection, thereby securing the nozzle tip in a fixed position relative to the nozzle assembly of a spray gun. U.S. Pat. No. 3,556,411 discloses such a nozzle assembly.

When used in high pressure airless spray systems, there has been a sporadic but recurring problem as a consequence of brazing failures between the nozzle and nozzle adapter. Upon failure of the brazed joint, the nozzle tip of an airless spray nozzle may be blown from the nozzle adapter toward the workpiece at a relatively high velocity with the result that it may ricochet off of a workpiece or spray booth and cause a personnel hazard.

It has therefore been an objective of this invention to provide an improved airless spray nozzle which eliminates the hazard of a nozzle tip being blown from the nozzle adapter upon a failure of the brazing material. To this end the invention of this application utilizes a pair of swaged lips formed on the nozzle adapter around the bore within which the nozzle tip is mounted and swaged over a flange of the nozzle tip to mechanically lock the tip into the adapter. The brazing material is retained between the adapter and the tip to form a liquid seal between the two, but the swaged lip provides the mechanical strength for retaining the tip in the adapter even if there is a failure of the brazing material. In this construction though the brazing material is far less subject to failure because it is not under a force tending to cause it to shear or fail, such force being resisted by the swaged lips of the adapter.

The invention of this application also contemplates a novel method for manufacturing this unique nozzle assembly. According to the practice of this method, very little additional machining is required over what has been utilized in the past for manufacturing the prior art spray nozzle, so that a much safer nozzle assembly results from the practice of this method at very little, if any, additional cost.

According to the practice of this method, an adapter of relatively soft machineable metal such as stainless steel is drilled and counterbored so as to form an axial bore through the adapter. An annular groove is then machined by a trepanning tool into the front face of the adapter so as to form an annular lip around the conuterbored portion of the axial bore inside of the groove and an annular ring on the front face outside of the groove. A portion of this annular lip and the annular ring is then machined from the front face of the adapter by a pair of straddle mill cutters so as to leave two diametrically opposed lips on opposite sides of the axial passage through the adapter and two ears spaced radially outwardly of the lips. A hardened nozzle tip is then subsequently mounted within the axial passage of the adapter, and the lips are subsequently swaged over a portion of the tip so as to securely lock the tip within the axial passage of the adapter. The tip is then brazed within the bore so as to form a liquid tight seal between the tip and the adapter.

The primary advantage of this method resides in the fact that it requires very little additional machining of the adapter to provide swaged lips which mechanically lock the tip to the adapter. Consequently the brazed joint between the tip and the adapter is no longer relied upon for securing the tip within the adapter and for resisting the liquid pressure internally of the nozzle which tends to force the nozzle tip out of the adapter. Because the swaged lips are discontinuous about the periphery of the tip, there is a space between the lips and the spaced ears through which a cutter grinder wheel may subsequently be passed to cut an outlet orifice in the nozzle tip.

The primary advantage of this invention is that for very little, if any, additional cost it results in an airless spray nozzle which is safer than prior art nozzles.

These and other objects and advantages of this invention will be more readily apparent from the following description of the drawings in which:

FIGS. 3a, 4a, 5a, 6 and 7 are cross sectional views through the nozzle adapter and nozzle tip illustrating the method for manufacturing the spray nozzle of FIG. 1.

Figure 3A:
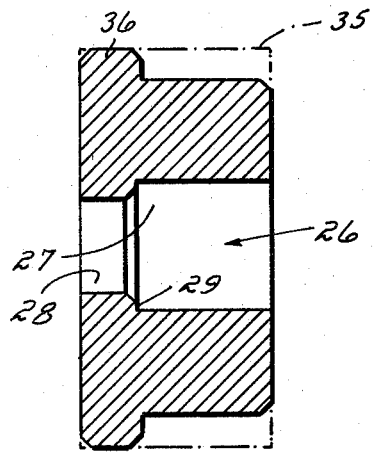
Figure 3B:
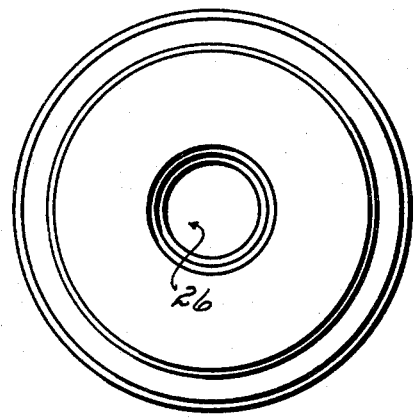

FIGS. 3b, 4b, and 5b are front elevational views of the nozzle adapter depicted in FIGS. 3a, 4a and 5a respectively.

Figure 1:
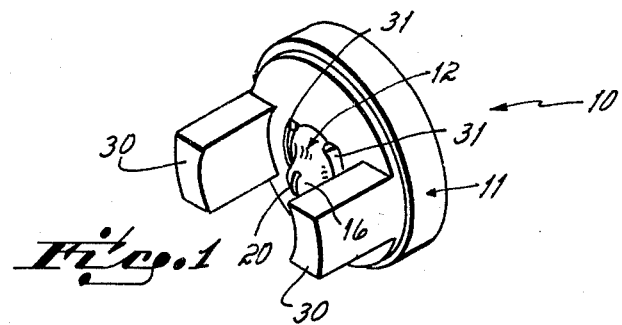
FIG. 1 is a front perspective view of a spray nozzle incorporating the invention of this application.
Figure 2:
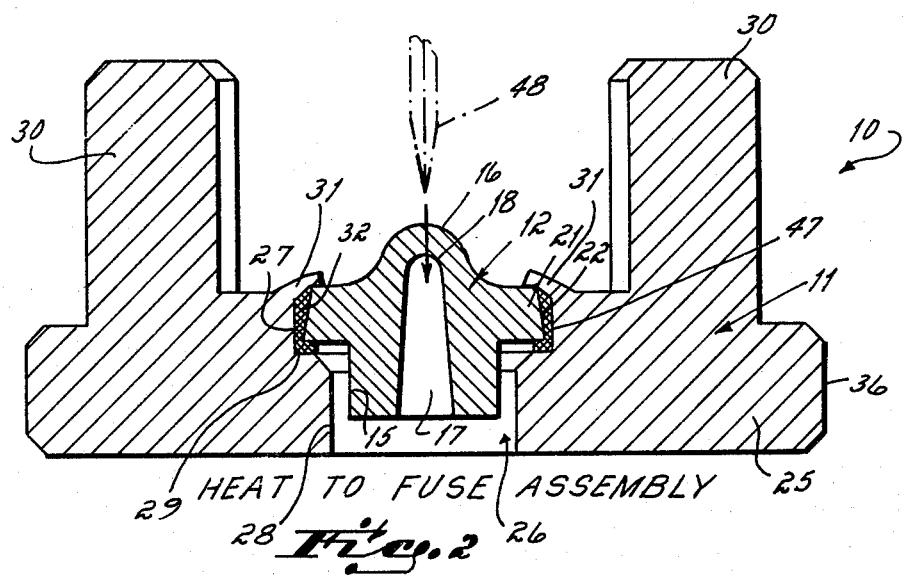
FIG. 2 is a cross sectional view through the spray nozzle of FIG. 1.

Referring to FIGS. 1 and 2 there is illustrated an assembled airless spray nozzle incorporating the invention of this application. This nozzle 10 comprises a nozzle adapter 11 and a nozzle tip 12. The nozzle tip 12 is made from a very hard, abrasive resistant material such as tungsten carbide. This type of material is chosen because paints, lacquers, and other liquids which contain abrasive solids in suspension are commonly sprayed through the nozzle at high pressures on the order of between 300-1,000 psi. These sprayed materials tend, in the course of passage through the nozzle, to abrade away the nozzle tip. To minimize that abrasive corrosion, very hard abrasive resistant materials are chosen for the nozzle tips. These materials are relatively expensive and difficult to machine. Accordingly, the tips 12 are made as small as possible and mounted within an adapter 11 which is more easily machineable and made from a less expensive material. One adapter material which is commonly chosen for these properties as well as its resistance to corrosion is stainless steel.

The nozzle tip 12 comprises a generally cylindrical section 15 terminating in a generally semi-spherical dome shaped end 16. Around the periphery of the tip there is a radially extending flange 21 which, as may best be seen in FIG. 2, has a slightly tapered outer surface 22. This surface tapers or slopes inwardly toward the forward end of the tip.

Interiorly of the cylindrical body section 15 there is a slightly tapered approach passage 17 which terminates in a generally semi-spherical blind recess 18. After assembly of the tip into the adapter and securement therein as explained more fully hereinafter, the approach passage is opened by grinding of an outlet orifice 20 (FIG. 1) through the dome shaped end 16 of the tip.

The nozzle adapter comprises a generally cylindrical body 25 within which there is located an axial bore 26. This bore is stepped and comprises a generally counterbored forward end section 27 and a smaller diameter rearward end section 28. A counter-sunk shoulder 29 is located between the two different diameter sections 27 and 28 of the bore 26. On the forward face of the adapter there is a pair of spaced ears 30 which functions to protect the nozzle tip 12 against inadvertent contact with foreign objects. Quite commonly, these nozzles are mounted in manually operated spray guns in which it is not uncommon for a human operator to move in such a way that the nozzle tip accidentally contacts a workpiece or other foreign object and becomes damaged. To avoid such accidental damage to the nozzle tip, the ears 30 extend forwardly on opposite sides of the tip.

The nozzle tip 12 is retained within the axial passage 26 of the adapter 11 by swaging of spaced lips 31 over the flange 21 of the nozzle tip after the tip is seated within the counterbored section 27 of the axial passage 26. The tip is sealed relative to the passage by a brazing compound 32 which forms a liquid tight barrier between the tip and the adapter. Because of the presence of the swaged lips 31 though, the brazing compound is not relied upon and it is not necessary to retain the tip 12 within the adapter 11.

Referring now to FIGS. 3-7, there is illustrated the method by which the nozzle 10 is manufactured. Referring first to FIG. 3a it will be seen that the nozzle adapter is manufactured from a generally cylindrically shaped slug 35 of stainless steel material. The peripheral surface of this slug 35 is initially turned to form a flange 36 at the rearward end of the slug. The slug is then drilled and counterbored to form the stepped bore 26 having the larger diameter section 27 at the forward end thereof. Subsequent to drilling and counterboring, and as can be seen in FIG. 4a, the slug has an annular recess 37 machined therein by a trepanning tool 38. While in the process of machining the recess 37, this trepanning tool machines the front surface 39 of an annular lip 40 located around the interior of the recess 37. At this point the slug 35 has an annular ring 41 located radially outwardly of the recess 37 and an annular lip 40 formed interiorly of the recess 37.

As can be seen in FIG. 5a, subsequent to the forming of the recess 37 and lip 40 by the trepanning tool 38, the front face of the slug 35 is milled by a pair of spaced straddle milling cutters 42-43 which cut away diametrically opposed portions of the annular ring 41 and diametrically opposed portions of the annular lip 40. The spaced milling cutters 42, 43 mill the sections of the annular ring 41 to the depth of the recess 37 and the sections of the annular lip 40 to this same depth so as to leave the pair of arcuately spaced lips 31 and the pair of diametrically opposed ears 30 spaced radially outwardly of the lips 31.

At this point in the machining process the adapter is completely formed and is ready for assembly of the tip 12 into the adapter.

With reference to FIG. 6 it will be seen that in one preferred practice of this invention a ring 45 of brazing material is inserted into the counterbored section of the axial bore 26 and placed against the shoulder 29. After being dipped in flux, the nozzle tip 12 is then inserted into the counterbored section of the bore 26 so that the flange 21 of the nozzle tip rests on top of the brazing ring 45. The lips 31 are then subsequently swaged over flange 31 by a swaging tool 46. These lips are so sized and configured that when swaged over the tip 12, they have sufficient resistance to bending to withstand three times the maximum hydraulic pressure which will be placed on the nozzle tip by liquid passing through the nozzle.

Subsequent to swaging of the lips 31 over the tip, the assembled nozzle 10 is heated to a temperature sufficient to melt the brazing ring 45 and cause it to flow and fill the recess 47 located between the periphery of the flange 21 of the nozzle tip and the counterbored section of the axial passage 26. The completed nozzle 10 is then generally brushed to clean scale from the nozzle.

The nozzle adapter and tip are at this stage completely assembled and ready for machining of the outlet orifice 20 into the nozzle tip. This is commonly accomplished by passage of a diamond surfaced cutter grinder wheel 48 through the dome shaped end 16 of the tip. The machining of this nozzle orifice is critical to the proper size and functioning of the nozzle. To that end the nozzle assembly is commonly mounted in a special grinding fixture (not shown) and the cutter grinding wheel 48 passed between ears 30 and between the lips 31 to machine the generally elongated orifice 20 from the dome.

The primary advantage of the practice of this invention is that it results in a nozzle assembly which is much more resistant to having the nozzle tip blown from the adapter by hydraulic pressure than have been the prior art nozzles, such as the nozzle disclosed in U.S. Pat. No. 3,556,411, which it replaces. Prior to the practice of this invention it was common practice to simply braze the nozzle tip into the adapter and rely upon the brazing compound to prevent the nozzle tip from being blown out of the adapter. However, periodically the brazing material would fail and the tip would be ejected from the adapter at sufficient pressure and velocity to create the potential for an accident. By providing the ears 30 on the end of the nozzle and by forming the lips 31 in the manner heretofore described, there is provided at little if any additional expense, a nozzle which is much safer than that which it supersedes.

While I have described only one preferred nozzle and method of manufacturing the nozzle, persons skilled in the art will appreciate numerous changes which may be made in the practice of the invention without departing from the spirit of my invention. For example, the brazing material could be flowed into the recess after swaging of the nozzle lips 31 over the flange of the nozzle rather than by placement of a brazing ring beneath the nozzle tip before it is inserted into the adapter. Alternatively, adhesive or other sealant materials may be used in lieu of the brazing compound 32. These and other changes and modifications will be apparent to persons skilled in the art, and therefore I do not intend to be limited except by the scope of the following appended claims.

Having described my invention, I claim:

1. The method of manufacturing a spray nozzle comprising a nozzle tip and nozzle adapter, said nozzle tip being made from a hard, abrasive resistant material and said nozzle adapter being made from a material which is less hard, less abrasive resistant, and more easily machineable than the material from which said nozzle tip is made, which method comprises, forming on said tip a generally semi-spherical dome shaped external peripheral surface, forming in said tip an axial approach passage terminating in a blind, generally semi-spherical end cavity coaxially aligned with said approach passage and said dome shaped peripheral surface, drilling and counterboring an axial passage through said adapter, said counterbored portion of said axial passage extending inwardly from a front face of said adapter, machining an annular groove in the front face of said adapter so as to form an annular lip on said front face between said counterbored passage and said annular groove and an annular ring between said annular groove and the peripheral surface of said adapter, milling opposite sides of said front face of said adapter to the depth of said annular groove so as to create a pair of spaced arcuate ears on opposite sides of the front face of said adapter and a pair of arcuate lips spaced inwardly from said ears, inserting said tip into said counterbored axial passage of said adapter, swaging said pair of lips over a portion of said tip so as to secure said tip within said bore, brazing said tip to said adapter so as to form a liquid tight seal between the peripheral surface of said tip and the axial passage through said adapter, and forming a discharge opening in communication with said approach passage in said nozzle tip.

2. The method of claim 1 wherein said discharge opening is formed by passing a cutter grinder wheel between said spaced lips and through said dome shaped peripheral surface of said tip so as to create a discharge orifice in said nozzle tip.

3. The method of claim 1 in which the opposite sides of said front face of said adapter are simultaneously milled by a straddle milling cutter.

4. The method of manufacturing a spray nozzle comprising a nozzle tip and nozzle adapter, said nozzle tip being made from a hard, abrasive resistant material and said nozzle adapter being made from a material which is less hard, less abrasive resistant, and more easily mechineable than the material from which said nozzle tip is made, which method comprises, forming on said tip a generally semi-spherical dome shaped external peripheral surface, forming in said tip an axial approach passage terminating in a blind, generally semi-spherical end cavity coaxially aligned with said approach passage and said cone shaped peripheral surface, drilling and counterboring an axial passage through said adapter, said counterbored portion of said axial passage extending inwardly from a front face of said adapter, machining the front face of said adapter so as to form an annular lip on said front face between said counterbored passage and said machined portion of said front face, milling opposite sides of said front face of said adapter to the depth of said annular lip so as to create a pair of spaced arcuate lips on opposite sides of the axial passage through said adapter, inserting said tip into said counterbored axial passage of said adapter, swaging said spaced lips over a portion of said tip so as to secure said tip within said bore, applying sealing material between said tip to said adapter so as to form a liquid tight seal between the peripheral surface of said tip and the axial passage through said adapter and forming a discharge opening in communication with said approach passage in said nozzle tip.

5. The method of claim 4 wherein said discharge opening is formed by passing a cutter grinder wheel between said spaced lips and through said dome shaped peripheral surface of said tip so as to create a discharge orifice in said nozzle tip.

* * * * *